April 15, 1958 R. S. LONG ET AL 2,830,874
ION EXCHANGE PROCESS FOR THE RECOVERY AND
PURIFICATION OF MATERIALS
Filed June 1, 1950
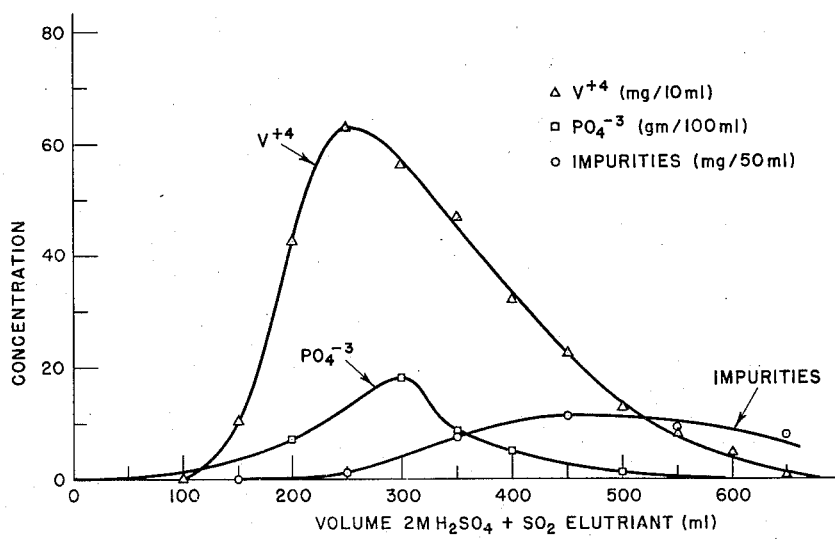
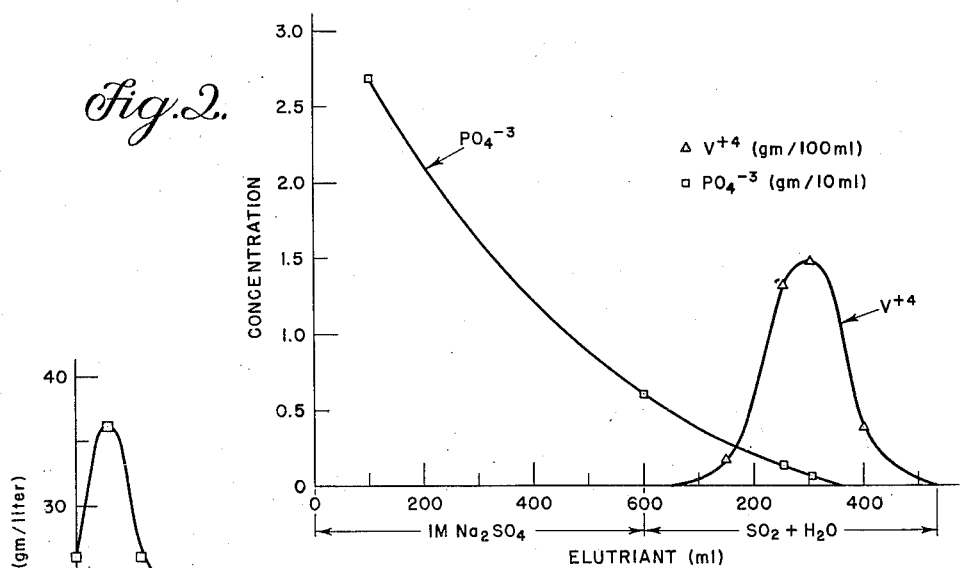
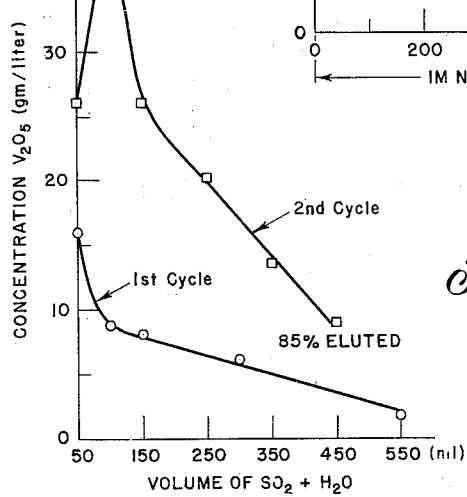
INVENTORS.
RAY S. LONG
RICHARD H. BAILES
BY
Roland A. Anderson
ATTORNEY.

United States Patent Office 2,830,874
Patented Apr. 15, 1958

2,830,874

ION EXCHANGE PROCESS FOR THE RECOVERY AND PURIFICATION OF MATERIALS

Ray S. Long, Vallejo, and Richard H. Bailes, Walnut Creek, Calif., assignors, by mesne assignments, to the United States of America as represented by the United States Atomic Energy Commission Application June 1, 1950, Serial No. 165,532

6 Claims. (Cl. 23—18)

This invention relates, in general, to the recovery and purification of substances and, more particularly to the separation, purification and concentration of substances by means of ion exchange processes.

Certain of the subject matter disclosed in the present case is claimed in the related and copending application of Richard H. Bailes and Ray S. Long, Serial No. 159,744, filed May 3, 1950, now Patent No. 2,756,123, issued July 24, 1956.

Early ion exchange processes employed naturally occurring zeolite materials, or other natural materials which had been altered by chemical or physical treatment, in simple processes for adsorbing ions from solutions as, for example, in the softening of hard water. These materials were sometimes regenerated by passing various agents through the beds of material to remove adsorbed ions en masse. However, few if any of the older materials possessed sufficient chemical stability to allow contact with highly acidic or basic solutions without serious or complete destruction of the beds of materials.

Later, with the development of high polymer chemistry, it was found possible to provide very stable high-polymer base materials with reactive chemical groups which were found to behave in a manner similar to the older materials with respect to ionic exchange but which possess a far greater utility and adaptability, not only due to their stability in highly acid or basic solutions, but also due to the specificity of the reactive groups and the high adsorptive capacity of the resin.

These newer materials are generally termed "ion-exchange resins" and are considered to comprise stable resinous materials which possess numerous reactive groups capable of exchanging their ionizable components for other ions of the same sign in a solution. Ion exchange resins are further classified as cationic or anionic exchange resins dependent upon their ability to adsorb or exchange cations or anions.

During the evolutionary development of the ion exchange processes it was noted that the ions of various materials were adsorbed at different rates from a solution and were retained by the resin with varying degrees of stability upon subsequent contact with a solution in which an ion of the material was comparatively stable. Moreover the quantity of material adsorbed is also dependent upon the specificity of adsorption which the resin exhibits toward particular materials. These properties of ion exchange resins may be applied to the resolution of complex mixtures of ionic materials by controlling conditions so that the materials are selectively adsorbed and/or are selectively eluted from the resin.

While ionic materials which differ widely in the rate or degree at which they are adsorbed by the resin from a solution or which are differentially eluted at markedly different rates may easily be separated by such a simple process, many refinements of the process are required when a material is to be separated either from a complex mixture or from one or more substances which are adsorbed or eluted at nearly the same rate or to nearly the same degree.

An important refinement of the process consists in adsorbing the ions to be separated on a column of the ion exchange resin and then eluting the materials under such conditions that the materials are caused to undergo many adsorption-dissolution cycles as they are eluted through the column.

The rate at which each of the ions travel through such a column will depend, in general, upon the stability of the resin-ion bond relative to the stability of these ions of the material in the eluting solution. Since, for each material, these stabilities differ to a greater or lesser degree, the different materials are separated into bands or zones along the column of resin and in the solution in contact therewith. When appropriate conditions are employed so that many adsorption-dissolution cycles are traversed by the ions, as they travel through the column, substances which differ only minutely in the rates of adsorption and dissolution may easily be separated. In this respect, the operation of an ion exchange column may be considered to be analogous to the operation of an efficient fractionating column wherein the many cyclic stages magnify the effect of minute component differences to make possible the separation of components having very similar properties.

Now it has been found possible to provide efficient ion exchange processes, for separating the components of complex mixtures and recovering particular components thereof, including the selective adsorption of ions on the ion exchange resin and selective elution of particular components from adsorbed mixtures of ions, and wherein a novel method of treating the adsorbed ions is employed to facilitate the selective elution of said particular components. More particularly, the adsorbed ions, i. e., anions or cations, are treated to convert at least some of said ions to an ion of opposite charge (cations are converted into anions or vice versa) and the converted ions are eluted from the resin. The two operations may be performed in successive steps or they may be performed concurrently with modifications in the choice of reagents.

Accordingly, it is an object of the invention to provide new and improved ion exchange processes for recovering and purifying substances.

Another object of the invention is to provide new and improved methods of adsorbing ions on an ion exchange resin.

Another object of the invention is to provide new and improved methods for selectively eluting materials from an ion exchange resin.

A further object of the invention is to provide new and improved methods for eluting cationically adsorbed materials from an ion exchange resin wherein said material is converted to an anionic form either prior to or concurrently with selective elution from said resin.

A still further object of the invention is to provide new and improved methods for eluting anionically adsorbed materials from an ion exchange resin wherein said material is converted to a cationic form either prior to or concurrently with selective elution from said resin.

Other objects and advantages will become apparent upon consideration of the following description taken in conjunction with the attached drawings, of which:

Figure 1 graphically illustrates the elution of vanadium separately from impurities using a sulfuric acid elutriant;

Figure 2 is a graphical illustration of the elution of vanadium separately from impurities including phosphates by means of water and sulfur dioxide;

Figure 3 shows the increase of concentration obtained in a two cycle elution.

In accordance with the invention, there is produced a solution of the materials to be separated in an ionic form suitable for adsorption on an ion exchange resin. The ionic form of the desired material or of the impurity material which is desired to be eliminated is chosen in accord with certain considerations which will become apparent as the description proceeds. Then the solution is contacted with an anionic or cationic exchange resin dependent upon whether the desired material is in an anionic or cationic form whereby said material is adsorbed upon said resin. In a complex mixture of materials unwanted materials also will be adsorbed on the resin and present a difficult problem of separation since all the adsorbed ions will be retained with varying degrees of stability and, in conventional methods, selective or specific eluting agents are required to effect a sharp separation. However, in accordance with the present invention, the adsorbed ions are treated in such a fashion that the ions of the desired material or of the impurity are selectively converted to an ion of opposite charge whereupon said material or the impurity may be rapidly and easily eluted with a sharp separation from the other adsorbed ions.

Due to the conversion of the adsorbed ion to the oppositely charged form, the converted ion becomes, by far, the most lightly retained ion then upon the resin and after conversion only water is needed to effect an efficient elution. The reason for the ease of such an elution is clearly apparent when it is considered that an ion in the converted form could not have been adsorbed by the resin during the original adsorption, i. e. the affinity of the exchange resin for the converted ionic form is lowered to a very low level. Accordingly, a powerful adjunct is provided for separating particular materials from a complex mixture adsorbed on an ion exchange resin.

It is contemplated that the principles underlying the processes of the invention may be applied to the recovery and purification of a great many substances. It has been found particularly advantageous to apply these principles to the recovery of vanadium from solutions such as the relatively concentrated crude phosphatic solutions produced incident to the production of superphosphate fertilizers and industrial phosphoric acids.

Very large quantities of phosphate ores are processed in the production of superphosphate fertilizers, phosphoric acid and other materials. In a majority of these ores there is a low concentration of vanadium which has heretofore been recovered only by rather inefficient processes and the recovery is complicated by the relatively high concentration of phosphate present.

Considering now the details of the invention as applied to the recovery and purification of vanadium from solutions with particular reference to crude phosphoric acid solutions or phosphatic solutions such as those encountered in the manufacture of phosphate fertilizers. For illustrative purposes, the following table indicates the approximate composition of a typical solution such as are obtained at various stages of the industrial processes.

| | | |
|---|---|---|
| $H_3PO_4$ | g./l. | 330 |
| $U_3O_8$ | mg./l. | 105 |
| V | g./l. | 1.48 |
| Fe | g./l. | 3.02 |
| Ca | percent | 0.155 |
| Mg | do | 0.2 |
| Al | do | 0.34 |
| F | do | 1.13 |
| Sulfate | do | 1.22 |
| Sp. Gr | | 1.207 |

The crude phosphoric acid solution or other similar solution containing vanadium and impurities is treated with an oxidizing agent to oxidize the vanadium present in the solution to the pentavalent oxidation state. In this oxidation state, vanadium exists in aqueous solutions as an anionic species (e. g. $VO_3^-$) and as such may undergo ion exchange with the ionizable components of an anionic exchange resin and thereby be adsorbed thereon. A strong oxidizing agent must be used in the oxidation of the vanadium to the pentavalent state since vanadium in this state is itself a strong oxidizing agent. Oxidizing agents which have been found to be satisfactory for the practice and operation of the invention include electrolytic oxidation, permanganate, chlorate, manganese dioxide and hydrogen peroxide. Others which may be used include a majority of those which have an oxidation potential of a similar magnitude. The progress of the vanadium oxidation is conveniently and simply observed by the changes in color of the solution. Solutions of vanadium in the pentavalent state have a yellow color while the solution is blue in color when the vanadium is in the tetravalent oxidation state, as $VO^{++}$. More specifically, the anionic exchange adsorbable vanadium is present as a pentavalent vanadium complex anion in which phosphate is the complexing agent. This ion is of a cationic species and, therefore, is not adsorbed by the anionic exchange resin in the column. Solution mixtures of the pentavalent and tetravalent states have a green color.

The oxidized solution, prepared in accordance with the foregoing, is passed through a bed of an anionic exchange resin whereby anionic materials including the vanadium is adsorbed on the resin and cationic materials remain in the solution. The resins found most satisfactory for the purposes of the invention comprise ion exchange resins of highly ionizable basic types such as those which possess quaternary ammonium substituent groups as the reactive components and these resins are preferred; however, less actively basic resins such as those having primary amine substituent groups may be employed with less efficiency. Resin mesh sizes found most satisfactory are from about 10 to 100 standard mesh and they may be employed in any apparatus provided with influent and effluent stream openings and which provides suitable support for the resin. The exchangeable anion originally adsorbed on the resin may conveniently be either chloride, sulfate or phosphate while other suitable anions may likewise be employed.

Differential elution of the vanadium from the resin is accomplished by contacting the adsorbed material with a reducing agent and eluting agent either successively or concurrently whereby the anionically adsorbed vanadium is converted to a cationic form and is easily eluted from the resin.

In the first alternative method, a reducing agent sufficiently strong to reduce the vanadium to the tetravalent oxidation state is passed through the resin bed. Sulfurous acid, sulfur dioxide gas, or ferrous sulfate have been found satisfactory; however, other reducing agents may likewise be employed. A suitable elutriant is then passed through the resin bed to remove the reduced vanadium.

In the second alternative method, the reducing and eluting agents may be combined as a single solution which is passed through the resin bed. Sulfurous acid dissolved in water or in dilute sulfuric acid solution has been found to be very satisfactory while ferrous sulfate and acids other than sulfuric may be likewise employed.

The secondary conditions of the reaction are not critical. Temperature, pressure and variations of quantities of the impurities present in the initial solutions have only secondary effects on the reaction. Such secondary effects are also meant to include the duration of resin life, the optimum flow rates, and similar process characteristics which do not change the primary described procedure of the process.

A modification of the process which results in the recovery of a solution containing higher concentrations of vanadium comprises a cyclic operation of a plurality of columns each filled with an anionic exchange resin as described above. In such an operation each of the plurality of resin columns is saturated with anions to near total capacity by contact with a sufficiently large volume of the oxidized vanadium bearing solution as heretofore described. Each of the resin columns is then treated with a reducing agent such as sulfur dioxide gas as described above whereby the vanadium is reduced to the tetravalent oxidation state and becomes a cationic species. One of the columns is then eluted with a saturated aqueous solution of sulfur dioxide. The effluent elutriant which is rich in vanadium dissolved as a cation is then resaturated with respect to sulfur dioxide and is used as the elutriant in a second one of said resin columns whereby vanadium adsorbed by the second column is reduced and eluted into the effluent elutriant which cycle is then repeated with others of said columns until the desired degree of concentration is obtained.

The above described elution method yields the vanadium contaminated with considerable amounts of phosphates. In the event that it is desired to separate the vanadium from the phosphate an alternative elution method may be employed. This elution is conducted in two steps, the first step being an elution of the phosphate ions from the resin by passing sodium sulfate solution through the column whereby a large part of the phosphate is eluted and vanadium is not, and then the reduction-elution of vanadium as heretofore described is instituted and the vanadium removed substantially free of phosphate contamination.

Particular details of the above-described processes will become apparent by a consideration of the following examples wherein a crude phosphoric acid solution is treated in accordance with the invention.

EXAMPLE I

Twelve hundred milliliters of commercial phosphoric acid having a composition similar to that indicated above (vanadium about 1.48 g./l.) was oxidized to a dark yellow color with a slight excess of potassium permanganate and the oxidized acid was passed through a column 1" in diameter and 27" in length of 300 grams of 100 mesh Dowex 2, a quaternary ammonium type of anionic exchange resin, in the sulfate form. Each successive 100 ml. of acid which flowed through the column was retained for analysis. These analyses of effluent acid are summarized in Table 1.

Table 1

| Volume of Effluent | Vanadium in Effluent, g./l. | Vanadium Adsorbed, percent |
|---|---|---|
| 100 | .02 | 99 |
| 200 | | |
| 300 | .07 | 95.5 |
| 400 | | |
| 500 | 0.08 | 95 |
| 600 | | |
| 700 | 0.08 | 95 |
| 900 | | |
| 1,000 | 0.08 | 95 |
| 1,100 | 0.10 | 93.3 |
| 1,200 | | |

Vanadium was eluted from the resin with 800 ml. of a 2 M sulfuric acid solution into which sulfur dioxide gas had been bubbled for 10 minutes. Table 2 shows the manner in which vanadium and phosphate appear in the effluent elutriant solution substantially free of contaminants.

Table 2

| Vol. of Elutriant, ml. | V Eluted, mgm./10ml. | Phosphate, gm./100 ml. |
|---|---|---|
| 50 | .6 | |
| 150 | 9.8 | |
| 250 | 64.0 | 7.2 |
| 350 | 47.6 | 18.2 |
| 450 | 22.0 | 4.8 |
| 550 | 8.4 | 1.0 |
| 650 | 1.8 | |

After 600 ml. of the elutriant had passed through the resin 1.5 grams of the estimated 1.68 grams of vanadium adsorbed on the resin had been eluted. The vanadium was obtained as a concentrate in a phosphate solution which could be processed or treated to recover the vanadium. The results of the above elution are also graphically illustrated in Figure 1.

EXAMPLE II

Three liters of industrial phosphoric acid having a composition similar to that indicated above was oxidized by the addition of about 15 grams of manganese dioxide, i. e., a quantity sufficient to cause the acid to become a dark yellow color. This oxidized acid was then passed through a column filled with 100 mesh Dowex 1, an anionic exchange of the quaternary ammonium type, which resin was in the chloride form and was employed in a column 1" in diameter and 34" in length. The column was next treated with 600 ml. of 1 M sodium sulfate as an elutriant to remove most of the phosphate as illustrated by the phosphate elution curve ($PO_4^{-3}$) of Figure 2. Then an elutriant comprising 200 ml. of saturated sulfurous acid was employed to reduce the vanadium to the tetravalent state and elute the adsorbed vanadium as a tetravalent cation, concurrently, as shown by the curve of Figure 2. The phosphate recovered in this manner may then be recovered and used as such or may be reconverted to phosphoric acid and be combined with the original acid while the concentrated vanadium solution may then be processed to recover the vanadium.

EXAMPLE III

Eight liters of phosphoric acid having a composition similar to that indicated above was oxidized by heating with manganese dioxide until the yellow color did not increase in intensity with further addition of manganese dioxide. Four liters of the oxidized vanadium-bearing acid solution was then passed through two columns each containing 300 grams of Dowex 2, an anionic exchange resin of the quaternary ammonium type whereupon the resin columns adsorbed about 5 grams of vanadium each. These two columns were eluted successively, after gaseous sulfur dioxide gas had been passed through each column, with one portion of water saturated with sulfur dioxide. Between the elution of the first and second columns the elutriant was resaturated with sulfur dioxide to insure the maintenance of the vanadium in the tetravalent oxidation state and thus insure complete elution of the vanadium as a cation. The results of these elutions are graphically illustrated in Figure 3. The peaks of both of the curves occur during the passage of the first 100 ml. of the elutriant with $V_2O_5$ concentrations ($V_2O_5$ is used as the basis of the analysis) of 16 gm./l. and 31.5 gm./l. after the first and second cycles, respectively. On completion of the elution, i. e., after about 500 ml. of elutriant had passed through the first column and about 450 ml. of the same elutriant solution had been passed through the second column, about 85% of the vanadium had been removed from the columns and were thus recovered in a concentrated form substantially free of the impurities originally found associated therewith.

With appropriate substitution, certain of the foregoing manipulative steps of the processes of the invention are applicable to the separation and purification of other materials besides vanadium. Manganese, molybdenum and chromium may be adsorbed from acidic solution on an anionic exchange resin as $MnO_4^-$, $MoO_4^{--}$ (or as polymolybdate anions) and $Cr_2O_7^{--}$, anions, respectively. The adsorbed manganese and chromium compounds may be eluted with dilute acid either after treatment with a reducing agent (only a weak reducing agent is required) or by the use of a reducing agent in an acidic eluting solution, whereby the cations $Mn^{++}$ and $Cr^{+++}$ are the ions formed by conversion and which are eluted. Molybdenum may likewise be eluted; however, a strong reducing agent is required to reduce the adsorbed molybdenum to yield the anion $Mo^{+++}$. With a mild reducing agent and in highly acid solution the molybdenum can be eluted as the anion $MoO_2^+$. Chromium values may also be adsorbed as the anion $CrO_4^=$ from an alkaline solution and then be eluted with dilute acid after reduction to the trivalent state. Qualitative tests have indicated that the chromium and manganese elutions operate with an efficiency comparable to that of the vanadium.

While the foregoing examples have indicated that the materials are adsorbed as anions and are converted to and are eluted as cations, under some circumstances it may be advantageous to produce a solution of the material in a cationic form, as for example, a solution of the cations which are eluted from the anionic exchange resins, then adsorb these cations on a cationic exchange resin and convert the cations to an anionic form and elute the anionic form from the resin. In the case of each of the materials indicated in the examples above, the conversion from the cationic form to the anionic on the resin may be effected by employing a suitable oxidizing agent such as those employed to oxidize the vanadium in the phosphoric acid solution. It will be appreciated that the elutriant medium must be a solvent or solution in which the anionic conversion form is soluble and such elutriants may be solutions which are appropriate to yield compositions similar to those noted above in which the particular value exists as an anion. For example, tetravalent vanadium contained in a solution may be adsorbed on a cationic exchange resin such as Dowex 50 (a resin which possesses sulfonic substituent groups capable of exchanging cations) and then be converted to a pentavalent anion and eluted as such with a sodium chlorate solution. In an article entitled "Fundamental properties of a synthetic cation exchange resin," by W. C. Bauman and J. Eickhorn, published in the Journal of the American Chemical Society, 69, pp. 2830–2836 (1947), it is stated that Dowex 50 is an aromatic polymer of the type described by D'Alelio in U. S. Patent No. 2,366,007 which issued on December 26, 1944. Such article is stated to be a contribution of the Dow Chemical Co. Moreover, since the material eluted from an anionic exchange resin is in the cationic form, a cationic adsorption and subsequent elution may advantageously be employed to effect further purification. Of course, materials eluted in the cationic form may also be adsorbed by a cationic exchange resin and eluted as an anion.

Other agents in addition to oxidation and reduction may be employed to convert the anions to cations or vice versa. For example, cobalt present in a solution as $Co^{++}$ may be adsorbed on a cationic exchange resin. The adsorbed cobalt may then be converted into cobalticyanide ion $(Co(CN)_6^{-3})$ by contact with hydrogen cyanide gas and a weak oxidizing agent whereby it is eluted.

It will be apparent by elementary consideration of the foregoing that purification can be achieved in the adsorptive step since materials not in the ionic form appropriate to that in which the desired value is adsorbed on the ion exchange resin (anionic or cationic) remain chiefly in the original solution. Further separation and purification results when the desired material is converted to the oppositely charged form and is eluted from the resin since unconverted materials remain on the resin. Of course, the normal chromatographic adsorption and elution effects also may assist in eliminating impurities during passage of the reagent solutions through the resin beds similarly to the behavior noted supra. Since the novel operation of the invention does not interfere with normal functioning of ion exchange processes, this valuable aid may be utilized to facilitate recovery and purification of cation having interconvertible anionic and cationic forms in many kinds of ion exchange processes.

While the salient features of the invention have been described in detail with respect to specific embodiments, it will, of course, be apparent that numerous modifications may be made therein which are within the spirit and scope of the invention and it is intended to cover all such as fall within the scope of the appended claims.

What is claimed is:

1. In an ion exchange process for separating values of a metallic element selected from the group consisting of vanadium, manganese, molybdenum, chromium and cobalt which element is capable of forming lower valent cations soluble in aqueous solutions and soluble higher valent anions in a mineral acidic aqueous solution from a mixture of metallic elements, the steps comprising producing an aqueous solution of said elements as cations, contacting said solution with a cationic exchange resin to adsorb said cations thereon, contacting said resin with an aqueous solution of an oxidizing agent to convert the adsorbed values of said element to said higher valent state on the resin, and then contacting the resin with an acidic aqueous solution thereby eluting values of said element away from cations remaining on the resin forming said soluble anions in the effluent eluate.

2. The process as defined in claim 1 wherein said metallic element comprises vanadium, the produced solution of cations is aqueous mineral acidic, and the oxidation agent employed to convert the vanadium cations to anions is sodium chlorate.

3. The process as defined in claim 1 wherein said metallic element comprises vanadium and said acidic aqueous solution which is contacted with the resin adsorbate is an acidic phosphatic solution.

4. In an ion exchange process for separating and recovering values of a metallic element selected from the group consisting of vanadium, manganese, molybdenum, chromium and cobalt, wherein there is produced an adsorbate of the values of said metallic element on a cationic exchange resin, the step comprising contacting said adsorbate with an acidic aqueous solution and additional components including an oxidizing agent, whereby the values of said element are converted into an anionic form which is eluted from the resin.

5. The process as defined in claim 4 wherein the adsorbate is formed with vanadium values and the acidic solution comprises an acidic aqueous phosphatic solution.

6. The process as defined in claim 4 wherein the adsorbate is formed with cobalt values and the solution which is contacted with the adsorbate includes HCN and the oxidizing agent is a weak oxidizing agent.

References Cited in the file of this patent

Sussman et al.: Industrial and Engineering Chemistry, vol. 37, pages 618–622 (1945).

Spedding et al.: A Rapid Separation of the Rare Earths Employing Ion Exchange, MDDC–410, declassified Aug. 28, 1946; Technical Information Div., AEC, Oak Ridge, Tenn. Page 1 only.

Ayres: Purification of Zirconium by Ion Exchange Columns, MDDC–1026, declassified June 30, 1947. Technical Information Div., AEC, Oak Ridge, Tenn.